UNITED STATES PATENT OFFICE.

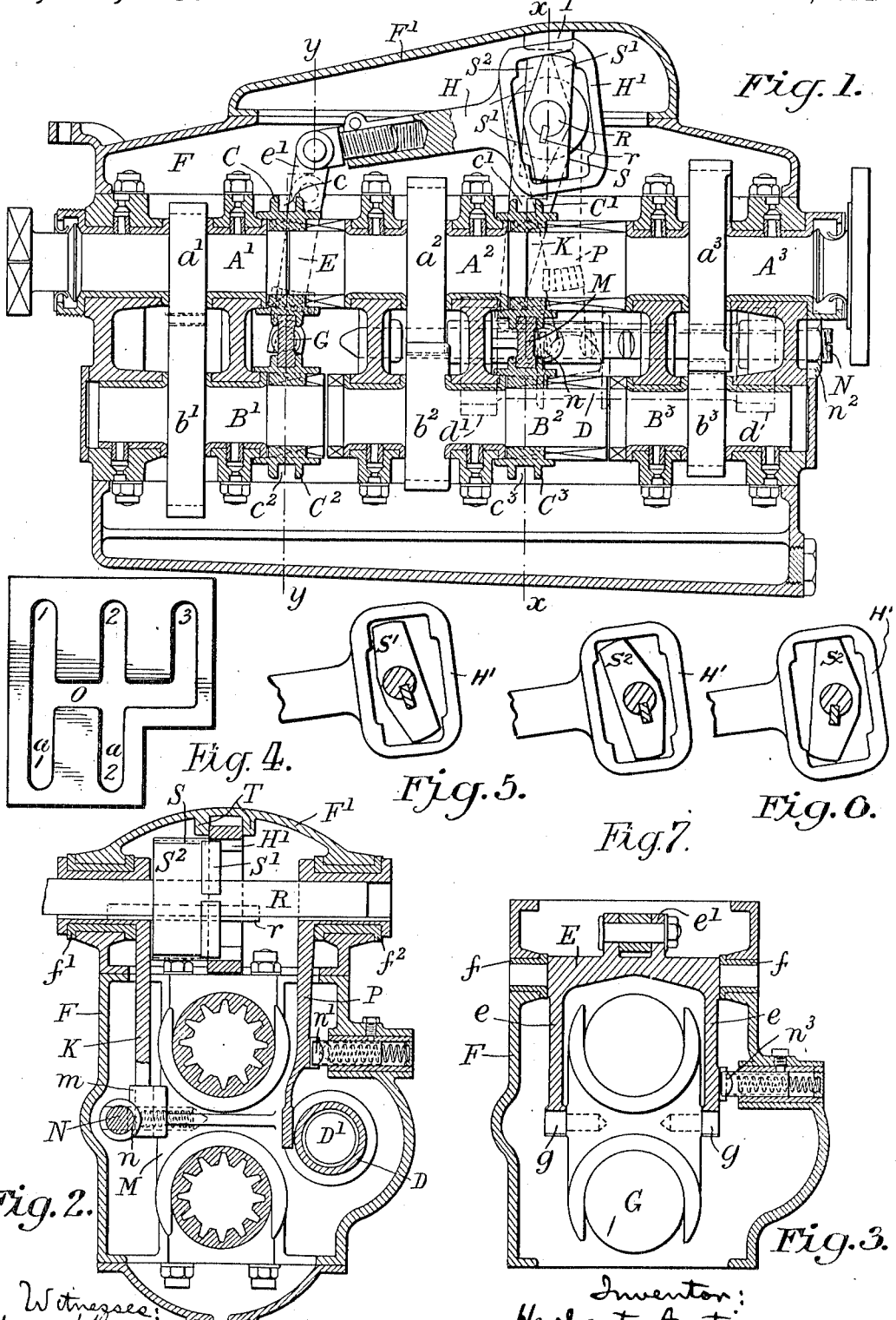

HERBERT AUSTIN, OF BROMSGROVE, ENGLAND.

CHANGE-SPEED GEARING.

1,118,389. Specification of Letters Patent. Patented Nov. 24, 1914.

Application filed July 6, 1912. Serial No. 707,993.

*To all whom it may concern:*

Be it known that I, HERBERT AUSTIN, a subject of the King of Great Britain, and residing at Bromsgrove, in the county of Worcester, England, engineer, have invented certain new and useful Improvements in Change-Speed Gearing, More Particularly for Use With Automobiles, of which the following is a specification.

According to this invention, the gear wheels of change-speed mechanism are each one carried by a separate shaft with which it is permanently rigid, and the shafts are arranged in two sets of three or more shafts each of which the shafts of each set have a common axis, and the common axis of one set of shafts is parallel with the common axis of the other set. The shafts of each set or any two shafts of each set which are adjacent to one another may be coupled together by suitable clutches. The gear wheel of each shaft of one set of shafts which have a common axis permanently gears with a corresponding wheel of one of the shafts of the other set which have a common axis. The top speed is direct through one (which for convenience I term the primary) set of shafts, all the shafts being for such purpose coupled together, while the shafts of the other (which for convenience I term the secondary) set of shafts are all uncoupled from one another and run idly in their bearings, being driven, respectively, from the corresponding wheels which are carried by the shafts of the primary set.

For a four-speed gearing, three shafts are used in each set and, conveniently, the next lower speed from the top speed is from the second shaft of the primary set to the second shaft of the secondary set and then back from the third shaft of the secondary set to the third shaft of the primary set, the first and second shafts of the primary set being coupled together, the first and second shafts of the secondary set being uncoupled from one another, the second and third shafts of the secondary set being coupled together, and the second and third shafts of the primary set being uncoupled from one another. The next lower speed is from the first shaft of the primary set to the first shaft of the secondary set, then back from the second shaft of the secondary set to the second shaft of the primary set, and thence direct through the third shaft of the primary set, the first and second shafts of the primary set being uncoupled from one another, the second and third shafts of the primary set being coupled together, the first and second shafts of the secondary set being coupled together, and the second and third shafts of the secondary set being uncoupled from one another. The next or lowest speed is from the first shaft of the primary set to the first shaft of the secondary set and back from the third shaft of the secondary set to the third shaft of the primary set, the second shaft of the primary set being uncoupled from the first and third shafts of such set and the three shafts of the secondary set being coupled together. The reverse shaft is mounted within the gear box and is slidable endwise, and this shaft carries two wheels which, when the shaft has been moved into one extreme position endwise are out of gear with any of the wheels of the change-speed gear, but which, when this shaft has been moved into its other extreme position endwise gear, respectively, with the wheel of the second shaft of the secondary set and the wheel of the third shaft of the primary set, and the reverse drive is from the first shaft of the primary set through the first and second shafts of the secondary set, and thence through the reverse shaft to the third shaft of the primary set, the second shaft of the primary set being then uncoupled from both the other shafts of such set, the first and second shafts of the secondary set being coupled together, and the second shaft of the secondary set being uncoupled from the third shaft of such set.

The clutches may be operated by any suitable mechanism, but special mechanism for the purpose has been devised which will be presently described.

In order that the invention may be clearly understood, I will now describe a convenient practical application thereof, in the case of a four-speed gearing, by reference to the accompanying drawings, of which:—

Figure 1 is a longitudinal vertical section of my improved change-speed gearing, shown as inclosed within the gear-box. Fig. 2 is a section taken, approximately, on line *x x* of Fig. 1. Fig. 3 is a section taken, approximately, on line *y y* of Fig. 1, with portions omitted to avoid unnecessary drawing. Fig. 4 is a diagrammatic view of the gate hereinafter described. Figs. 5, 6 and 7 show different positions of certain parts of the mechanism hereinafter described.

$A^1$, $A^2$, $A^3$, are the shafts of the primary set, and $B^1$, $B^2$, $B^3$, the corresponding shafts of the secondary set, this set being shown as vertically below the primary set.

$a'$, $a^2$, $a^3$, are gear wheels which are rigid with the shafts $A^1$, $A^2$, $A^3$, respectively, and $b'$, $b^2$, $b^3$, are gear wheels which are rigid with the shafts $B^1$, $B^2$, $B^3$, respectively. The wheel $a^2$ is of larger diameter than the wheel $a'$, and the wheel $a^3$ is of larger diameter than the wheel $a^2$. The wheels $a'$, $a^2$, $a^3$, are always fully in gear with the wheels $b'$, $b^2$, $b^3$, respectively. The shafts $A^1$, $A^2$, may be coupled together by a sliding clutch member C. The shafts $A^2$, $A^3$ may be coupled together by a clutch member $C^1$. The shafts $B^1$, $B^2$ may be coupled together by a clutch member $C^2$, and the shafts $B^2$, $B^3$ may be coupled together by a clutch member $C^3$. For the top speed, the drive is direct through the shafts $A^1$, $A^2$, $A^3$, the shafts $B^1$, $B^2$, and $B^3$, being uncoupled from one another and running idly in their bearings. The next lower speed is from the wheel $a^2$, to the wheel $b^2$ and then back from the wheel $b^3$ to the wheel $a^3$, the shaft $B^1$ simply running idly in its bearings. For the next lower speed the drive is from the wheel $a'$ to the wheel $b'$ and back from the wheel $b^2$ to the wheel $a^2$, and thence through the shaft $A^3$, the shaft $B^3$ simply running idly in its bearings. For the next or lowest speed, the drive is from the wheel $a'$ to the wheel $b'$ and back from the wheel $b^3$ to the wheel $a^3$, the shaft $A^2$ simply running idly in its bearings. The reverse shaft is, conveniently, formed as a sleeve D which is slidable on a horizontal bar $D^1$ having its axis parallel with the axes of the two sets of change-speed shafts. Rigid with this shaft D are gear wheels $d$ and $d'$ which, when the shaft is in one extreme position endwise, as shown by broken lines (Fig. 1), are out of gear with any of the wheels of the change-speed mechanism, but which, when the shaft is moved into its other extreme position endwise gear, as to the wheel $d$, with the wheel $a^3$, and as to the wheel $d'$, with the wheel $b^2$, the reverse drive being from the wheel $a'$ to the wheel $b'$, from the wheel $b^2$ to the wheel $d'$, and from the wheel $d$ to the wheel $a^3$.

I will now describe the means by which the clutches are operated to give the required changes of speed and by which the reverse shaft is moved endwise. The clutches C $C^2$ are operated simultaneously through the medium of a double-sided hanging lever E which is pivoted within bearings $f$ of the gear-box F, the lower ends of the sides $e$ of the lever being formed with open slots which engage with studs $g$ of a plate G which fits within and passes partially around grooves $c$ $c^2$ of the clutches. This lever is operated through the medium of a link H which is connected at one end with an upward extension $e'$ of the lever and is formed at its other end with a bridle $H^1$. The clutches $C^1$ $C^3$ are operated simultaneously by means of a hanging lever K which is pivoted in a bearing $f'$ of the gear-box, and engages at its lower end within a box $m$ of a plate M which fits within and passes partially around grooves $c'$ $c^3$ of the clutches and is guided along a guide bar N which is fixed within the gear-box. The reverse shaft is operated by a hanging lever P which is pivoted in a bearing $f^2$ at the opposite side of the gear-box to that at which the bearing $f'$ is situated, and engages at its lower end with a groove of the shaft. A shaft R which may be moved endwise, and also partially turned, by a suitable lever (not shown) which operates within a suitable gate, Fig. 4, as will be readily understood, passes slidably through and is journaled within the upper end of the lever K and enters also and is journaled within the upper end of the lever P, and this shaft passes also, intermediate its bearings, through the bridle $H^1$. A feather key $r$ is fitted within the shaft R in such position therealong that it may be engaged, at will, either with a key groove of the lever K or with a key groove of the lever P by moving it endwise in the required direction. Fixed upon the shaft R is a block S divided into two widths $S^1$ and $S^2$ each of which forms a rocker capable of being entered, as the shaft R is moved endwise in the required direction therefor, into the bridle $H^1$, one or other of these rockers always being within such bridle and supporting it. The upper end of the bridle is always between a pair of lugs T which project downward from the cover $F^1$ of the gear-box, and the bridle is thus kept in position sidewise.

The rocker $S^1$ is shown in Figs. 1 and 2 as partially within the bridle $H^1$, and the rocker $S^2$ to be clear of the bridle, the key $r$ being in engagement with the lever K and to be clear of the lever P. The rocker $S^1$ has a straight back $s$ and a doubly inclined forward edge $s'$, and the rocker $S^2$ is similarly, but reversely, shaped. When the shaft R is in the endway position shown by Fig. 2, and has been turned into the position shown by Fig. 1, the upper end of its rear edge $s$ is against the upper portion of the rear edge of the interior of the bridle, and the lever E is thereby maintained in position holding the clutch C in clutch with the shafts $A^1$ and $A^2$ and the clutch $C^2$ in clutch with the shaft $B^1$ and out of clutch with the shaft $B^2$, and the lever K is in position holding the clutch $C^1$ in clutch with the shafts $A^2$ and $A^3$, and the clutch $C^3$ in clutch with the shaft $B^2$ and out of clutch with the shaft $B^3$. The lever P, which is then out of operative engagement with the shaft R, is in position holding the reverse shaft D out of action. To change the gear to the next lower speed, the hand lever of the shaft R is moved out of the slot 1 of the gate into the opposite slot 1ª thereof, turning the lever K in such direction and for such distance as to move the clutch member $C^1$ out of clutch with the shaft $A^2$, and the clutch member $C^3$ into clutch with the shaft $B^3$ clutching the shafts $B^2$ and $B^3$ together, the clutch member $C^1$ coming out of clutch with the shaft $A^2$ before the clutch member $C^3$ comes into clutch with the shaft $B^3$. During this operation, the rocker $S^1$ will turn within the bridle without moving it, and consequently the clutch members C and $C^2$ will remain as before. The position which the rocker $S^1$ then assumes within the bridle is shown by Fig. 5. To change the gear to the next lower speed, the hand lever is first moved out of the slot 1ª of the gate into the transverse slot O, turning the lever K into its mid-position in which the clutch member $C^3$ becomes disengaged from the shaft $B^3$, and the clutch member $C^1$ is not in clutch with the shaft $A^2$, this movement bringing the rocker $S^2$ into position for entering the bridle $H^1$. The hand lever is then moved along the slot O until it comes opposite the slots 2 and 2ª, which moves the rocker $S^1$ out of the bridle $H^1$ and the rocker $S^2$ thereinto, and then the hand lever is turned into the slot 2 and brings the clutch member $C^1$ into clutch with the shaft $A^2$, clutching the shafts $A^2$ and $A^3$ together, and at the same time the rocker $S^2$ moves the lever E and brings the clutch member C out of clutch with the shaft $A^1$ and the clutch member $C^2$ into clutch with the shaft $B^2$, clutching the shafts $B^1$ and $B^2$ together, the clutch member C coming out of clutch with the shaft $A^1$ before the clutch member $C^2$ comes into clutch with the shaft $B^2$. The position which the rocker $S^2$ then assumes within the bridle is shown by Fig. 6. To change the gear to the next or lowest speed, the hand lever is moved out of the slot 2 into the slot 2ª, moving the clutch member $C^1$ out of clutch with the shaft $A^2$ and the clutch member $C^3$ into clutch with the shaft $B^3$, clutching the shafts $B^2$ and $B^3$ together, the clutch member $C^1$ coming out of clutch with the shaft $A^2$ before the clutch member $C^3$ comes into clutch with the shaft $B^3$. During this operation the rocker $S^2$ will turn within the bridle without moving it, consequently the clutch members C and $C^2$ will remain as before. The position which the rocker $S^2$ then assumes within the bridle is shown by Fig. 7. If it is now desired to bring in the reverse gear, the hand lever is moved out of the slot 2ª into the slot O, bringing the clutch member $C^3$ out of clutch with the shaft $B^3$ without bringing the clutch member $C^1$ into clutch with the shaft $A^2$, the corresponding turning movement of the rocker $S^2$ having no effect on the bridle $H^1$. The hand lever is then moved along the slot O until it comes opposite the slot 3, whereby the key $r$ of the shaft R becomes disengaged from the lever K and engaged with the lever P, the rocker $S^2$, which is made sufficiently wide for the purpose, remaining in engagement with the bridle $H^1$ and supporting it. The hand lever is then turned into the slot 3, and moves the reverse shaft to bring its wheel $d$ into gear with the wheel $a^3$ and its wheel $d'$ into gear with the wheel $b^2$. The position of the rocker $S^2$ is then the same as shown in Fig. 6, the clutch members C and $C^2$ remaining in their position last described. In order to "feel" the hand lever into its mid-turning position, the box $m$ with which the lower end of the lever K engages is provided with a spring snap device $n$, having a double-beveled head which snaps into a V-notch of the bar N when the lever K is in its mid-position, and this snap device is utilized also for holding the lever in its extreme positions while it is disengaged from the key $r$ of the shaft R. The V-notches of the bar N into which the head $n$ snaps may be truly set with the hand lever by making the bar adjustable endwise, such as by screwing one end thereof into an end of the gear-box and locking it by a lock-nut $n^2$. Similar snap devices $n'$ $n^3$ hold the lever P and lever E, respectively, in their extreme positions. The link H is made adjustable as to length. As will now be obvious, sprocket wheels and chains may be substituted for spur wheels for giving the changes of speed, in which case the shafts $B^2$ and $A^3$ may carry wheels to gear with the wheels, respectively, of the reverse shaft, or, as will be obvious, the reverse shaft also may be chain driven, by providing suitable clutches for bringing it into and out of gear.

Having fully described my invention, what I claim and desire to secure by Letters Patent, is:—

1. In a change-speed gearing, two sets of shafts of not less than three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, and means by which shafts of each set may be coupled together.

2. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, means by which shafts of each set may be coupled together, one of the end shafts of one set always receiving first the power from the engine and the other end shaft of such set always transmitting the power from the engine, and the shafts of such set coupled together for the direct drive while the shafts of the other set are uncoupled from one another and run idly.

3. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, means whereby (a) shafts of each set may be coupled together, one of the end shafts of one set always receiving first the power from the engine and the other end shaft of such set always transmitting the power from the engine; whereby (b) the shafts of such set are coupled together, for the direct drive, while the shafts of the other set are uncoupled from one another and run idly; whereby (c) the first and second shafts of the first-mentioned set are coupled together for the next lower speed and the second shaft uncoupled from the third shaft thereof, and the second and third shafts of the other set are coupled together and the second shaft of such set uncoupled from the first shaft thereof, so that the drive is then through the first and second shafts of the first-mentioned set, through the second and third shafts of the second set and through the third shaft of the first set, the first shaft of the second set running idly; whereby (d) the middle shaft of the first-mentioned set is uncoupled from the first shaft thereof and coupled to the third shaft thereof, for the next lower speed, and the first and second shafts of the second set are coupled together and the second shaft of such set uncoupled from the third shaft thereof, so that the drive is then through the first shaft of the first-mentioned set, through the first and second shafts of the second set and through the second and third shafts of the first-mentioned set, the third shaft of the second set running idly; and whereby (e) the second shaft of the first mentioned set is uncoupled from the first and third shafts thereof, for the next or lowest speed, and all the shafts of the second set are coupled together, so that the drive is then through the first shaft of the first-mentioned set, through all the shafts of the second set, and through the third shaft of the first-mentioned set, the middle shaft of the first-mentioned set running idly.

4. In a change-speed gearing, two sets of shafts of not less than three shafts in each set, the shafts of each set having a common axis and always maintained in the same relative positions, and the axes of the two sets parallel with one another, each shaft of each set carried in separate bearings of the gear-box and a gear wheel fixed thereto, the gear-wheels of one set of alined shafts gearing, respectively, with the gear wheels of the other set of shafts, moving clutch members, slidable on the shafts, for coupling together the adjacent ends of shafts which are in alinement, and means for operating said clutch members.

5. In a change-speed gearing, two sets of shafts of not less than three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, means by which shafts of each set may be coupled together, a reverse shaft and two wheels thereof, with means by which said reverse shaft may be moved to bring one of the wheels into gear with a wheel of one of the shafts of one set and the other wheel into gear with a wheel of one of the shafts of the other set.

6. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, clutch mechanism for coupling and uncoupling shafts of the sets as required, which comprises clutches, a shaft transverse to the sets of parallel shafts, a rocker and bridle device which is operated by the transverse shaft to operate some of the clutches and a lever operable by said transverse shaft which itself operates other of the clutches.

7. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the corresponding wheel of the other set, clutches for coupling together, at will, shafts of either of each set, a shaft which is transverse to the sets of parallel shafts, a combination rocker and bridle device which is operated by the transverse shaft and operates clutches of the sets of shafts, the rocker portion and the bridle portion of the rocker and bridle device having one of them operative surfaces of different character and the rocker and bridle being capable of sideway movement one of them in relation to the other to enable the rocker action upon the bridle portion to be varied, a lever, and said transverse shaft movable axially into engagement with such lever through the medium of which it may then operate other clutches of the sets of shafts.

8. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the corresponding wheel of the other set, moving clutch members for coupling together the adjacent ends of shafts which are in alinement, a shaft which is transverse to the sets of parallel shafts, a rocker which is carried by such shaft and is divided into two widths which are reversely shaped, a bridle with which, by moving the shaft endwise, either of the two divisions of the rocker may be engaged and then turned by such shaft to operate the bridle, a lever through the medium of which certain of the clutches are operated from the bridle, a lever through which the said transverse shaft is slidable, and a key of such shaft which may be engaged with the lever by moving the shaft endwise in one direction and the lever then turned with the shaft to operate other of the clutches.

9. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the wheel of the corresponding shaft of the other set, clutches for coupling together, at will, shafts of either set or both sets, a reverse shaft and two wheels thereon and said reverse shaft slidable endwise to engage one of its wheels with a wheel of a shaft of one of the sets of shafts, and its other wheel with a wheel of one of the shafts of the other set of shafts, for reversing the drive, a shaft which is transverse to the sets of parallel shafts and is slidable axially, a combination rocker and bridle device of which the rocker portion is rigid with the transverse shaft, the bridle and rocker being movable sidewise one in relation to the other and one of them formed with operative surfaces which vary in relation to one another, whereby, through the medium of the rocker and bridle device, clutches of the sets of shafts may be operated as required, a lever with which the transverse shaft is engaged by moving it axially and through the medium of which it may operate other clutches of the sets of shafts, and a lever with which the transverse shaft may be engaged by axial movement after being disengaged from the other lever and, through the medium thereof, move the reverse gears into and out of action.

10. In a change-speed gearing, two sets of shafts of three shafts in each set, the shafts of each set having a common axis and always maintained in the same relative positions, and the axes of the two sets parallel with one another, a gear wheel rigid with each shaft of each set and constantly in gear with the corresponding wheel of the other set, moving clutch members for coupling together the adjacent ends of shafts which are in alinement, a reverse shaft and two gear wheels rigid therewith, said reverse shaft slidable endwise to engage one of its wheels with a wheel of one of the sets of alined shafts and its other wheel with a wheel of the other set of alined shafts, a shaft which is transverse to the sets of parallel shafts, a rocker which is carried by such shaft and is divided into two widths which are reversely shaped, a bridle with which, by moving the shaft endwise, either of the two divisions of the rocker may be engaged and then turned by such shaft to operate the bridle, a lever through the medium of which certain of the clutches are operated by the bridle, a second lever through which the transverse shaft is slidable, a key of such shaft which may be engaged with the second lever by moving the shaft endwise in one direction and the lever then turned with the shaft to operate other of the clutches, a third lever, with which the key of the said transverse shaft may be engaged by endway movement after being disengaged from the second lever, and be then turned by said shaft, and means by which said third lever operates the reverse shaft, to move it into or out of action as required, as said lever is turned by said transverse shaft.

In witness whereof I have hereunto signed my name this 25th day of June 1912 in the presence of two subscribing witnesses.

HERBERT AUSTIN.

Witnesses:
ERNEST HARKER,
ROBERT G. GROVES.